US011014708B1

(12) United States Patent
Cohen et al.

(10) Patent No.: US 11,014,708 B1
(45) Date of Patent: May 25, 2021

(54) PRODUCT TRANSPORTATION SYSTEM

(71) Applicant: CleanPal Holdco, LP, Atlanta, GA (US)

(72) Inventors: Amihay Cohen, Migdal Ha'Emek (IL); Gideon Feiner, Ramat Hasharon (IL)

(73) Assignee: CleanPal Holdco, LP, Atlanta, GA (US)

( * ) Notice: Subject to any disclaimer, the term of this patent is extended or adjusted under 35 U.S.C. 154(b) by 0 days.

(21) Appl. No.: 16/686,157

(22) Filed: Nov. 17, 2019

(51) Int. Cl.
*B65D 19/44* (2006.01)
*B65D 19/00* (2006.01)
*G06K 19/07* (2006.01)

(52) U.S. Cl.
CPC .......... *B65D 19/44* (2013.01); *B65D 19/004* (2013.01); *G06K 19/0723* (2013.01); *B65D 2519/008* (2013.01); *B65D 2519/0094* (2013.01); *B65D 2519/00268* (2013.01); *B65D 2519/00288* (2013.01); *B65D 2519/00308* (2013.01); *B65D 2519/00318* (2013.01); *B65D 2519/00338* (2013.01); *B65D 2519/00815* (2013.01); *B65D 2519/00835* (2013.01)

(58) Field of Classification Search
CPC .. B65D 2519/00935; B65D 2519/0094; B65D 2519/00955
USPC .................. 108/57.25, 55.3, 53.1, 53.3, 53.5
See application file for complete search history.

(56) References Cited

U.S. PATENT DOCUMENTS

| | | | | |
|---|---|---|---|---|
| 3,524,415 A * | 8/1970 | Heiman | ................ | B65D 19/004 108/53.3 |
| 3,944,070 A * | 3/1976 | Cardwell | ............. | B65D 19/004 206/596 |
| 3,993,168 A * | 11/1976 | Kubick | .............. | B65D 19/0034 108/53.1 |
| 4,480,748 A * | 11/1984 | Wind | ................. | B65D 19/0018 108/55.3 |
| 4,653,651 A * | 3/1987 | Flum | ...................... | B65D 71/70 108/53.1 |
| 4,735,321 A * | 4/1988 | Day | .................... | B65D 19/0036 100/2 |
| 4,765,252 A * | 8/1988 | Shuert | .................... | B65D 15/22 108/55.1 |
| 4,774,892 A * | 10/1988 | Ballard | .................. | B23Q 1/032 108/55.1 |

(Continued)

FOREIGN PATENT DOCUMENTS

| | | | | |
|---|---|---|---|---|
| EP | 1652784 | 5/2006 | | |
| EP | 2394922 A1 * | 12/2011 | .......... | B65D 19/004 |

(Continued)

OTHER PUBLICATIONS

Application No. PCT/US2020/060830, International Search Report and Written Opinion, dated Feb. 15, 2021, 14 pages.

*Primary Examiner* — Jose V Chen

(74) *Attorney, Agent, or Firm* — Kilpatrick Townsend & Stockton LLP

(57) ABSTRACT

The present invention provides a system for transporting products including a pallet consisting of a deck having an upper surface and a pattern of recesses formed in the upper surface including sets of recesses deployed for receiving a footprint of a layer of crates. A stacking element for deploying on the upper edges of the layer of crates consisting of a board including a surface, and a pattern of recesses formed in the surface including sets of recesses for receiving the upper edges of the layer crates.

21 Claims, 8 Drawing Sheets

(56) References Cited

U.S. PATENT DOCUMENTS

| | | | | |
|---|---|---|---|---|
| 4,838,176 | A * | 6/1989 | Bowser, Sr. | B65D 19/0018 108/53.3 |
| 5,052,307 | A * | 10/1991 | Morrison | B65D 19/38 108/53.1 |
| 5,080,023 | A * | 1/1992 | Miura | B65D 19/44 108/55.3 |
| 5,088,418 | A * | 2/1992 | Reckermann | B65D 19/44 108/57.25 |
| 5,974,981 | A * | 11/1999 | Ditton | B65D 71/70 108/55.3 |
| 6,530,476 | B1 * | 3/2003 | Overholt | B65D 71/0096 108/55.3 |
| D485,659 | S * | 1/2004 | Medoff | D34/38 |
| 7,819,068 | B2 * | 10/2010 | Apps | B65D 19/004 108/53.3 |
| 8,511,239 | B2 * | 8/2013 | Lin | B65D 19/0038 108/57.25 |
| 8,875,894 | B2 * | 11/2014 | Ness | B65D 25/04 206/598 |
| 10,017,296 | B2 * | 7/2018 | Burk | B65D 19/0038 |
| 10,661,944 | B2 * | 5/2020 | Apps | B65D 19/0008 |
| 2009/0050030 | A1 * | 2/2009 | Apps | B65D 19/004 108/53.3 |
| 2011/0179978 | A1 * | 7/2011 | Schmitt | B65D 19/0036 108/53.3 |
| 2011/0232539 | A1 * | 9/2011 | Broerman | B65D 19/0036 108/53.1 |
| 2013/0032507 | A1 * | 2/2013 | Du Toit | B65D 19/0012 206/599 |
| 2013/0277263 | A1 * | 10/2013 | Jung | B65D 71/04 206/459.5 |
| 2015/0068436 | A1 * | 3/2015 | Zelek | B65D 21/0233 108/53.3 |
| 2015/0108037 | A1 * | 4/2015 | Evans | B65D 19/18 206/600 |
| 2018/0251259 | A1 * | 9/2018 | Shuert | B65D 19/0018 |
| 2019/0135488 | A1 * | 5/2019 | Douralis | B65D 21/0217 |

FOREIGN PATENT DOCUMENTS

| | | | | |
|---|---|---|---|---|
| GB | 2252953 | | 8/1992 | |
| JP | 0885547 | | 4/1996 | |
| WO | 2006008928 | | 1/2006 | |
| WO | 2015014572 | | 2/2015 | |
| WO | WO-2015098421 A1 * | 7/2015 | | B65D 19/0012 |

* cited by examiner

PRODUCT TRANSPORTATION SYSTEM

TECHNICAL FIELD

The present invention is directed to products and goods transportation.

BACKGROUND OF THE INVENTION

Transportation concerns the movement of products from a source such as a plant, factory, farm, or workshop to a destination such as a warehouse, distribution center, customer, or retail store. The most common transport structure used to transfer products or goods is a pallet or a skid.

A pallet or a skid is a flat horizontal transport structure, which supports products or goods while being lifted by material handling equipment such as a forklift, a pallet jack, an erect crane and the like. A pallet is the structural foundation of a unit load which allows handling and storage efficiencies. Goods or shipping containers are often placed on the pallet secured with strapping, stretch wrap or shrink wrap and shipped.

While pallets are made of different materials such as plastic, metal, paper, etc. the majority of pallets are made of wood.

Wooden pallets, though vastly used, harbor several deficiencies, for example, significant storage space requirement, worker safety risks (nails, splinters, etc.), consumption of natural resource, material handling equipment damages, and food safety hazards.

SUMMARY OF THE INVENTION

The present invention provides a products transportation system including a pallet with handling and storage efficiencies, different crates suitable for transporting different products, and a stacking element for products protection and safe nesting.

Thus, according to an embodiment of the present invention there is provided a pallet for transporting products comprising: a deck having an upper surface; a pattern of recesses formed in the upper surface, the pattern of recesses comprising at least two of: a first set of recesses deployed for receiving a footprint of 6 crates substantially covering the deck and arranged in a 2×3 array, a second set of recesses deployed for receiving a footprint of 5 crates substantially covering the deck and arranged in a 5-per-layer configuration; and a third set of recesses deployed for receiving 4 crates in a 2×2 array. a plurality of legs extending downwards from the deck; and, a plurality of sockets formed in the deck, each socket of the plurality of sockets being positioned and shaped to receive a corresponding leg of another identical pallet to allow nesting of the pallet.

According to further features of an embodiment of the present invention, the pallet includes all three of the sets of recesses.

According to further features of an embodiment of the present invention, the pallet further comprising a plurality of alignment projections projecting upwards from the upper surface along at least two outer edges of the deck, each of the at least two outer edges having two halves, two of the alignment projections being deployed symmetrically within each of the halves of each of the at least two outer edges.

According to further features of an embodiment of the present invention, each of the plurality of sockets includes a central projection extending towards the upper surface.

According to further features of an embodiment of the present invention, the upper surface includes a plurality of apertures.

According to further features of an embodiment of the present invention, the deck includes a plurality of indentations in the external edges of the deck deployed for receiving a binding element.

According to further features of an embodiment of the present invention, the deck includes at least one friction enhancing portion positioned on the bottom side of the deck.

According to further features of an embodiment of the present invention, the friction enhancing portion is formed from an elastomeric material.

According to further features of an embodiment of the present invention, the pallet further comprising a radio-frequency identification (RFID) tag or computer chip integrated with the pallet.

There is also provided according to the teachings of an embodiment of the present invention, a transportation system comprising the pallet according to an embodiment of the present invention, wherein the system further includes: a stacking element comprising: a board including a surface for deploying on the upper edges of a layer of crates; and, a pattern of recesses formed in the surface, the pattern of recesses comprising at least two of: a first set of recesses deployed for receiving the upper edges of 6 crates arranged in a 2×3 array; a second set of recesses deployed for receiving the upper edges of 5 crates arranged in a 5-per-layer configuration; and, a third set of recesses deployed for receiving the upper edges of 4 crates arranged in a 2×2 array.

There is also provided according to the teachings of an embodiment of the present invention, a stacking element comprising: a board including a surface for deploying on the upper edges of a layer of crates; and, a pattern of recesses formed in the surface, the pattern of recesses comprising at least two sets of recesses selected for the group consisting of: a first set of recesses deployed for receiving the upper edges of 6 crates arranged in a 2×3 array; a second set of recesses deployed for receiving the upper edges of 5 crates arranged in a 5-per-layer configuration; and, a third set of recesses deployed for receiving the upper edges of 4 crates arranged in 2×2 array.

According to further features of an embodiment of the present invention, the stacking element includes all three of the sets of recesses.

According to further features of an embodiment of the present invention, the stacking element further comprising at least one engagement feature modified to engage with features on the upper edges of the layer of crates.

According to further features of an embodiment of the present invention, the at least one engagement feature is a projection positioned on the bottom side of the surface, the projection configured for engaging with at least one indentation on the upper edges of walls of at least one crate for fastening the stacking element to the top side of the at least one crate.

According to further features of an embodiment of the present invention, the at least one engagement feature is an indentation positioned on the bottom side of the surface, the indentation configured for engaging with at least one projection on the upper edges of walls of at least one crate for fastening the stacking element to the top side of the at least one crate.

According to further features of an embodiment of the present invention, the stacking element further comprising at least one engagement feature positioned on the bottom or top side of the surface, the at least one engagement feature is modified to engage with features on the top or bottom of a corresponding stacking element.

According to further features of an embodiment of the present invention, the at least one engagement feature is a projection complementary to at least one indentation on the top or bottom side of a corresponding stacking element, so as to stack the corresponding stacking element with the stacking element.

According to further features of an embodiment of the present invention, the at least one engagement is an indentation complementary to at least one projection on the top or bottom side of a corresponding stacking element, so as to receive the corresponding projection of the corresponding stacking element for stacking the corresponding stacking element with the stacking element.

According to further features of an embodiment of the present invention, the surface includes a plurality of reinforced regions to accommodate the legs of a pallet positioned on top of the stacking element.

There is also provided according to the teachings of an embodiment of the present invention, a transportation system comprising a stacking element according to an embodiment of the present invention, wherein, the system further includes: a pallet for transporting products including: a deck having an upper surface; and, a plurality of legs extending downwards from the deck.

According to further features of an embodiment of the present invention, stacking element includes a plurality of reinforced regions to accommodate the legs of the pallet positioned on top of the stacking element.

Unless otherwise defined herein, all technical and/or scientific terms used herein have the same meaning as commonly understood by one of ordinary skill in the art to which the invention pertains. Although methods and materials similar or equivalent to those described herein may be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE DRAWINGS

Some embodiments of the present invention are herein described, by way of example only, with reference to the accompanying drawings. With specific reference to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

Attention is now directed to the drawings, where like reference numerals or characters indicate corresponding or like components. In the drawings.

DETAILED DESCRIPTION OF THE DRAWINGS

Figure 1:
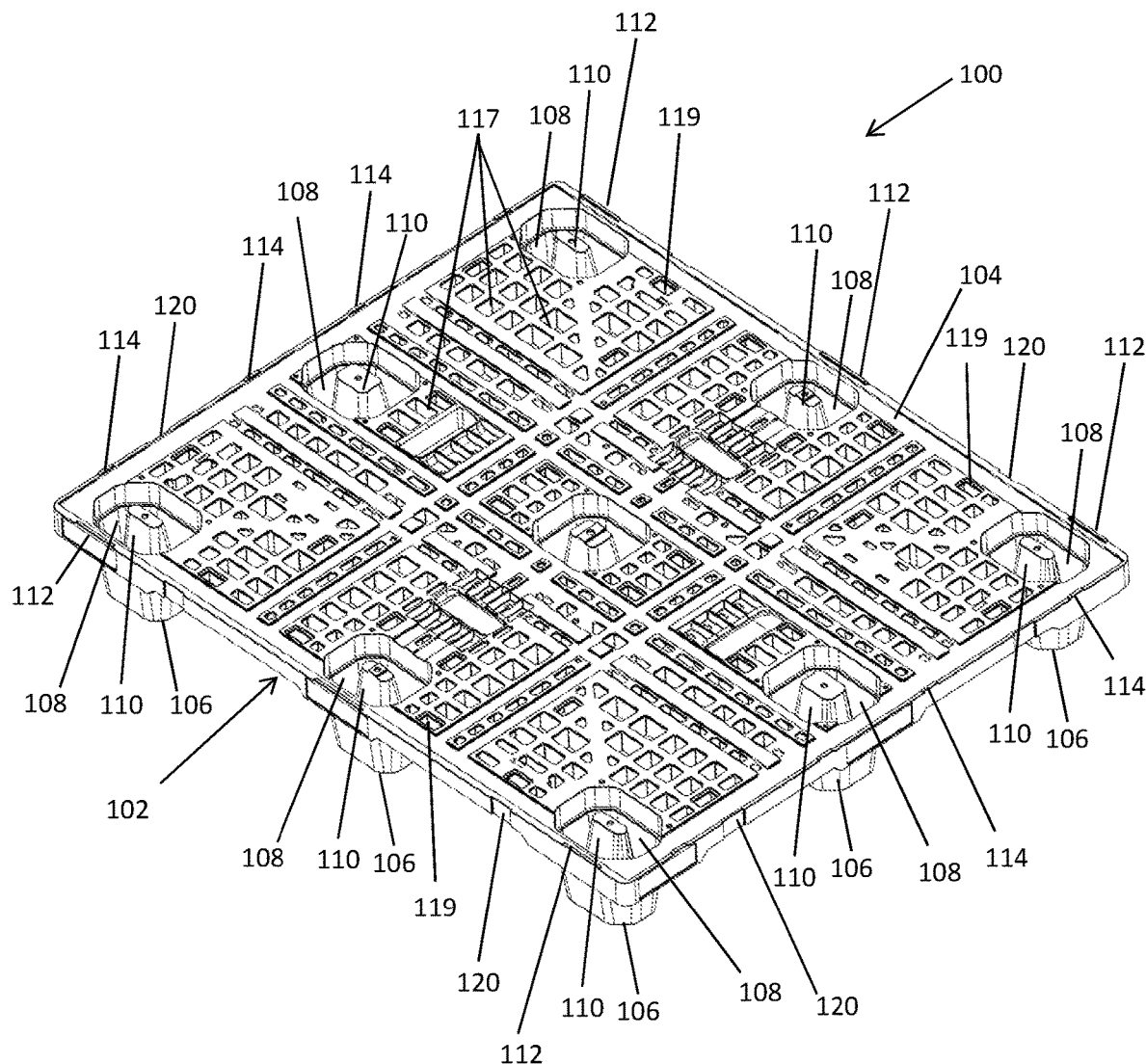
FIG. 1 is a top front perspective view of a pallet according to an embodiment of the present invention.

The present invention is not limited in its application to the details of construction and the arrangement of the components set forth in the following description. The invention is capable of other embodiments, or of being practiced or carried out in various ways. Also, it is to be understood that the phraseology and terminology employed herein is for the purpose of description and should not be regarded as limiting.

The present invention provides a products and/or goods transportation system including a pallet with handling and storage efficiencies, different crates suitable for transporting different products and/or goods, and a stacking element for products protection and safe nesting.

By way of introduction, most pallets can be broadly subdivided into two classes: generic flat pallets and application-specific pallets. Generic flat pallets typically have a flat deck surface which can be loaded with any desired produce or product in any desired arrangement. Wooden pallets typically fall into this category, as do many plastic pallets. Application-specific pallets are pallets with surfaces that are specially adapted to receive certain objects in certain layouts, typically by suitable deployment of various recesses and/or projecting features. A typically example of an application-specific pallet is a pallet with sockets or projections for securing shrink-wrapped multi-packs of bottles, or for anchoring a particular layout of crates on a pallet deck.

Application-specific pallets have advantages of stabilizing the goods on the pallet so that they are unlikely to become dislodged during shipping, even under conditions of considerable lateral impact and/or tilting. On the other hand, since a different type of pallet is required for each different type of product, handling of application-specific pallets presents major logistical challenges and increased costs for users dealing handling product types. In contrast, generic pallets provide maximum flexibility in terms of logistics for pallet usage, but fail to provide the stability offered by an application-specific pallet.

According to an aspect of the present invention, there is provided a pallet with a deck provided with a pattern of recesses formed in its upper surface, where the pattern of recesses includes at least two of: a first set of recesses deployed for receiving a footprint of 6 crates substantially covering the deck and arranged in a 2×3 array, a second set of recesses deployed for receiving a footprint of 5 crates substantially covering the deck and arranged in a 5-per-layer configuration, and a third set of recesses, preferably complemented by a safety lip with strategically placed design features deployed for receiving a 2×2 or 4-per-layer arrangement. Most preferably, the deck also features a plurality of alignment projections projecting upwards from the upper surface along at least two outer edges of the deck, with two of the alignment projections deployed symmetrically within each half of the corresponding outer edges. By providing these various combinations of features, it becomes possible to achieve interengagement between features of the deck and features of various different sizes of crates arranged in corresponding different stacking patterns on the surface of the deck. At the same time, since the features of interengagement are limited to relatively shallow recesses on the upper surfaces, and projections which are preferably limited to the outer periphery of the deck surface, the deck preferably remains usable as a generic pallet for additional applications, and the alignment features preferably do not interfere with compact nesting of the pallet with other similar pallets.

A further aspect of the present invention, useful alone or in combination with the aforementioned pallet, is a stacking element for deploying on top of a layer of crates which has engagement features, similar to those described in relation to the pallet deck surface, but modified to engage features of the upper edges of walls of the crates, for engaging different sizes of crates in different layouts, thereby stabilizing a stack of crates and/or distributing the load of an additional loaded pallet which may be stacked on top of an underlying stack of crates. Here too, a pattern of recesses preferably accommodates an arrangement of 6 crates substantially covering the deck and arranged in a 2×3 array, and an arrangement of 5 crates substantially covering the deck and arranged in a 5-per-layer configuration, as well as most preferably also an arrangement of 4 larger crates in a 2×2 layout.

These and other features of certain embodiments of the present invention will become clearer from the following description.

"Footprint" as used herein, refers to the configuration in which crates are positioned on top of a pallet so as to fully use the region of the pallet.

"5-per-layer" as used herein, refers to a layout of 5 rectangular crates having a long side and a short side. The layout includes 3 crates with their long sides adjacent and a further two crates with their long sides running adjacent to the short sides of the first 3 crates, such that the two crates meet at their short sides. This layout works best with crates having a lengths ratio of 2:3 between the short and long sides.

"Substantially covering" as used herein, refers to coverage of at least 95%, which is sufficient to be considered full use of the pallet.

FIG. 1 is a top front perspective view of the pallet 100. The pallet 100 includes a deck 102 having an upper surface 104 and a plurality of legs 106 extending downwards from the deck 102 and arranged at a sufficient distance from one another so as to allow lifting of the pallet 100 from all four sides. The deck 102 further features a plurality of sockets 108 extending into the legs 106 being positioned and shaped to receive a corresponding leg of another identical pallet to allow nesting of the pallet. Each socket 108 may further include, for example, a central projection 110 extending towards the upper surface 104. The central projection 110 provides an additional surface portion to the leg region to further support and stabilize the leg area as well as to add stiffness to it. The central projection 110 is shaped to be complementary to the shape of a corresponding leg of another identical pallet so as to allow nesting of the pallet.

Figure 2A:
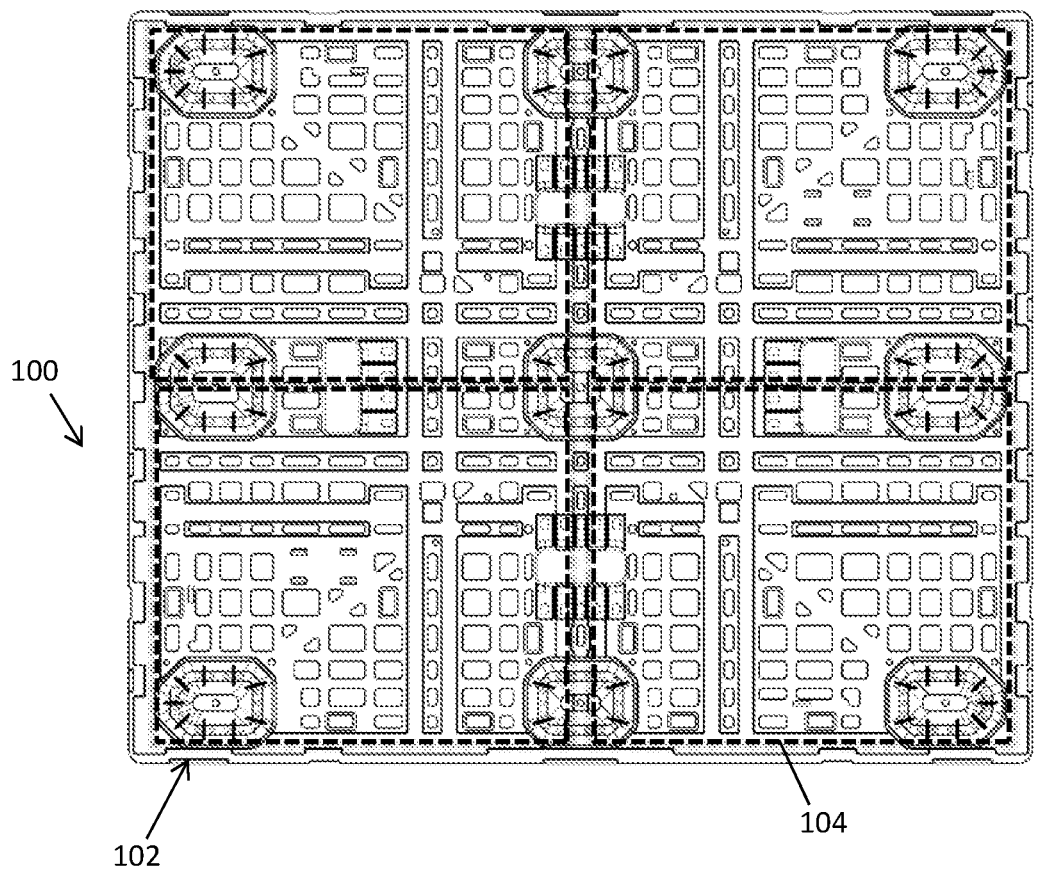
FIG. 2A is a top view of crates arranged in a 2×2 array on top of a pallet according to an embodiment of the present invention.
Figure 2B:
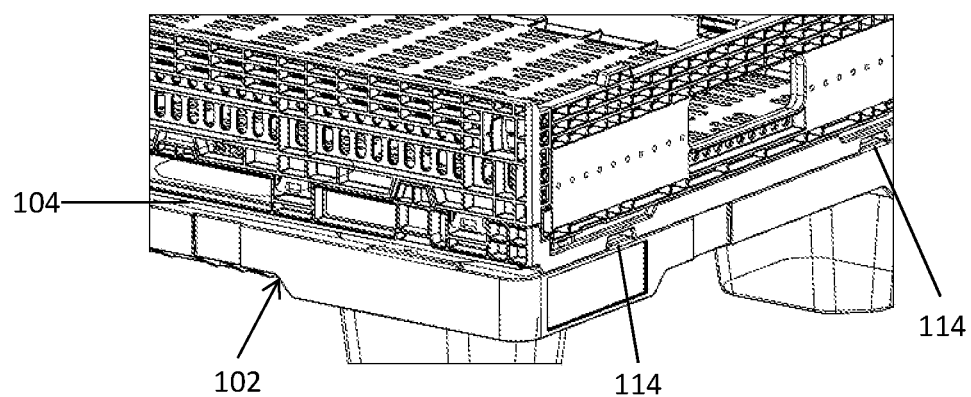
FIG. 2B is a cross-section view of a crate positioned on top of a pallet according to the embodiment of FIG. 2A.

The deck 102 further includes a plurality of alignment projections 112 and 114 projecting upwards from the upper surface 104 along at least two outer edges of the deck 102 with two of the alignment deployed symmetrically within each half of the corresponding outer edges. The interengagement of the projections 112 and 114 with features such as perimeter safety rims and indentations positioned on the bottom side of a plurality of crates make the upper surface 104 suitable for deployment of, for example, four crates arranged in a 2×2 array substantially covering the upper surface 104 (best seen in FIGS. 2A and 2B).

The deck 102 also features grommet inserts specifically designed to integrate with the design of deck 102 to ensure enhanced compatibility of the deck with different forms of transport packaging, not just crates, for example, corrugate, wood & wire, shrink wrapped items and products placed directly on the upper surface 104.

Figure 3A:
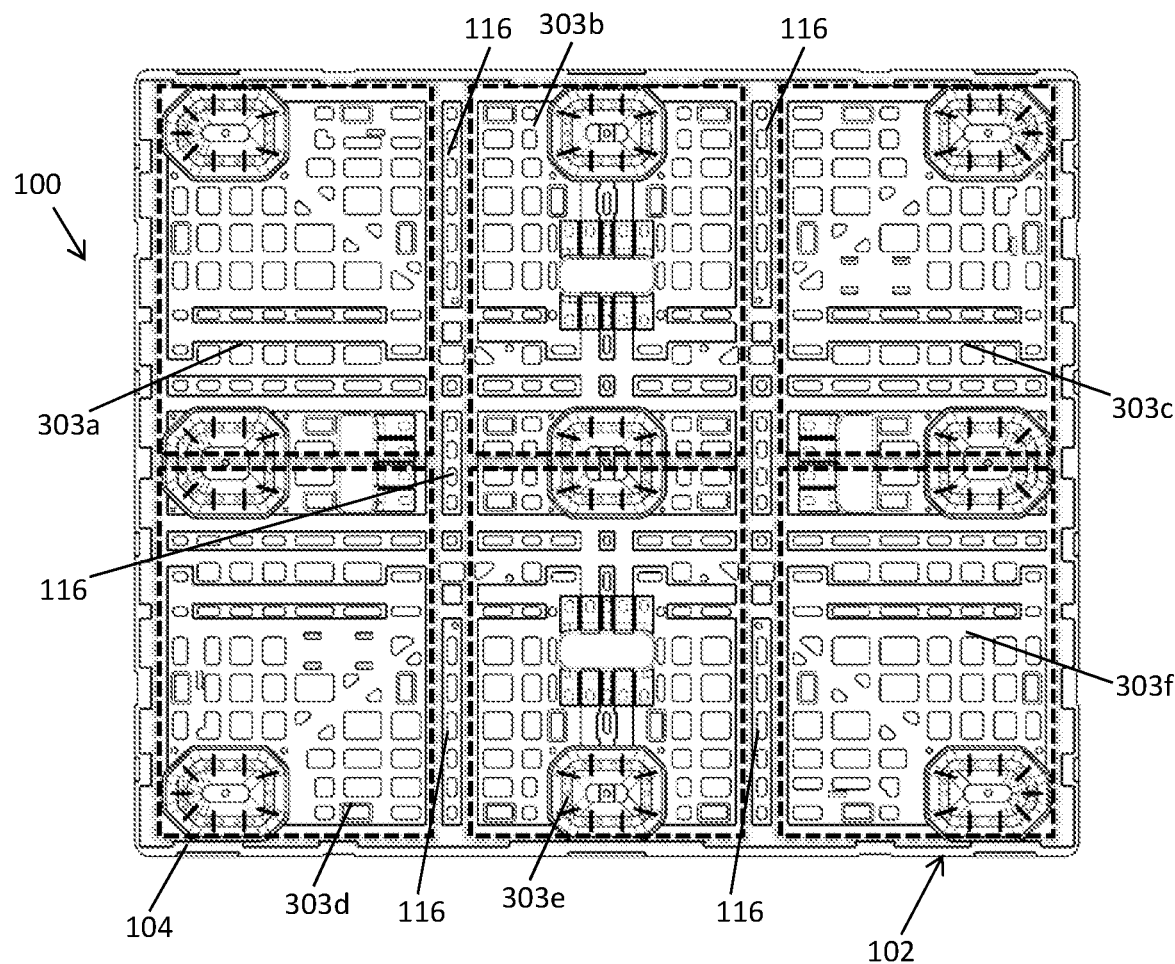
FIG. 3A is a top view of crates arranged in a 2×3 array on top of a pallet according to an embodiment of the present invention.
Figure 3B:
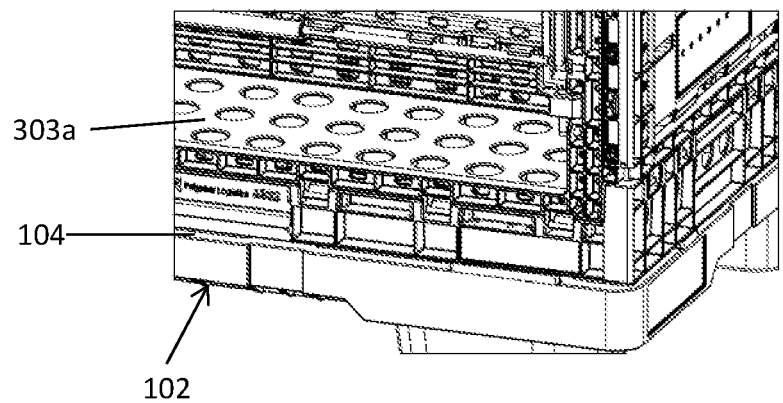
FIG. 3B is a cross-section view of a crate positioned on top of a pallet according to the embodiment of FIG. 3A.

The upper surface 104 further features a pattern of recesses. The pattern of recesses includes, for example, a first set of recesses 116 and a second set of recesses 118. The first set of recesses 116, best seen in FIG. 3A, is deployed, for example, for receiving a footprint of 6 crates, 303a-303f, substantially covering the deck 102 and arranged in a 2×3 array. The crates 303a-303f are positioned, for example, in a vertical position so as to provide full coverage of the upper surface 104. As seen in FIG. 3B, the crates 303a-303f are aligned with the dimensions of the deck 102.

Figure 4A:
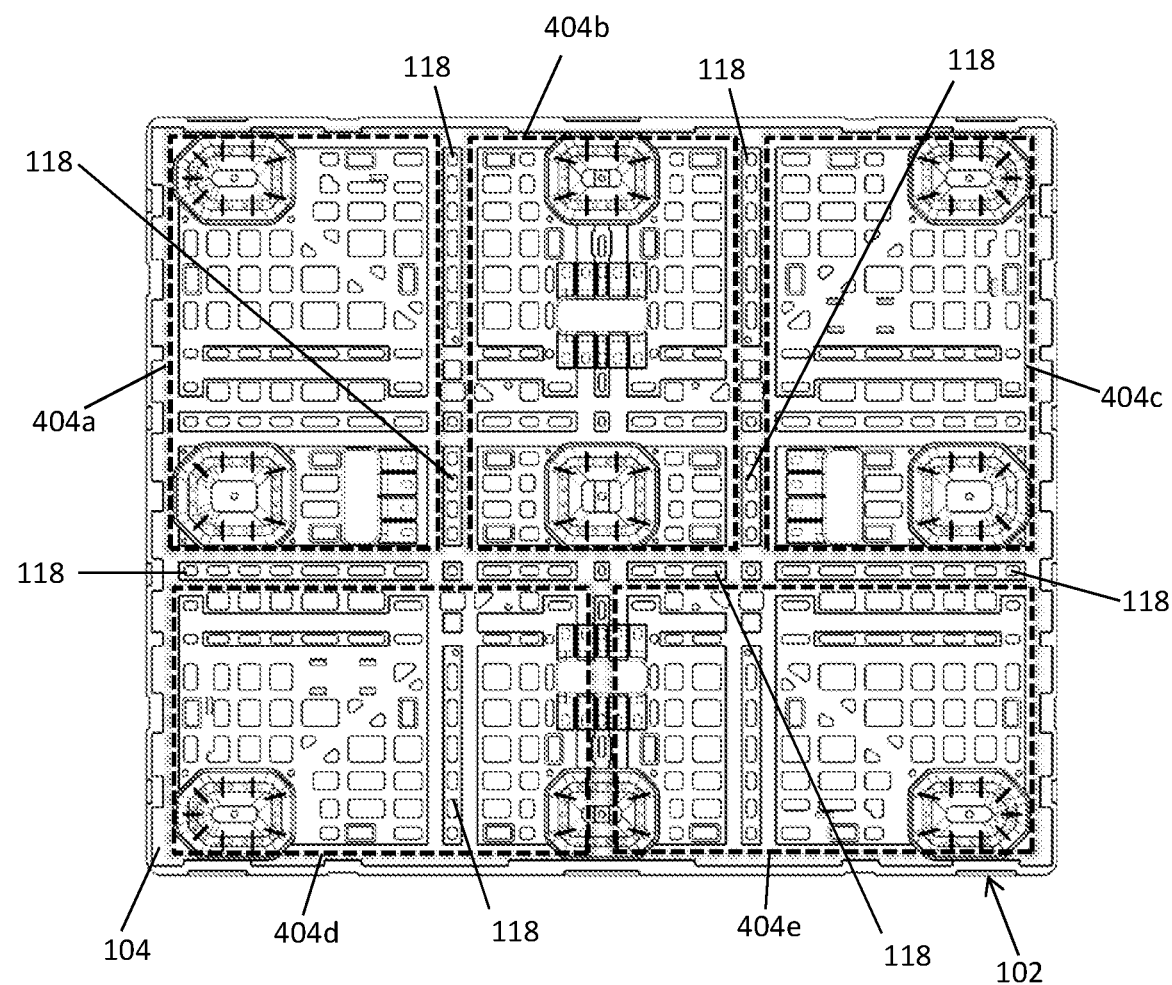
FIG. 4A is a top view of crates arranged in a 5-per-layer configuration on top of a pallet according to an embodiment of the present invention.

The second set of recesses 118, best seen in FIG. 4A, is deployed, for example, for receiving a footprint of 5 crates, 404a-404e, having a long side and a short side. The crates, 404a-404e, substantially cover the deck 102 and arranged in a 5-per-layer configuration. The crates 404a-404e are positioned such that, for example, crates 404a-404c are with their long sides adjacent whereas crates 404d-404e are with their long sides running adjacent to the short sides of crates 404a-404c, such that the crates 404d-404e meet at their short sides. This layout allows full coverage of the upper surface 104.

Figure 4B:
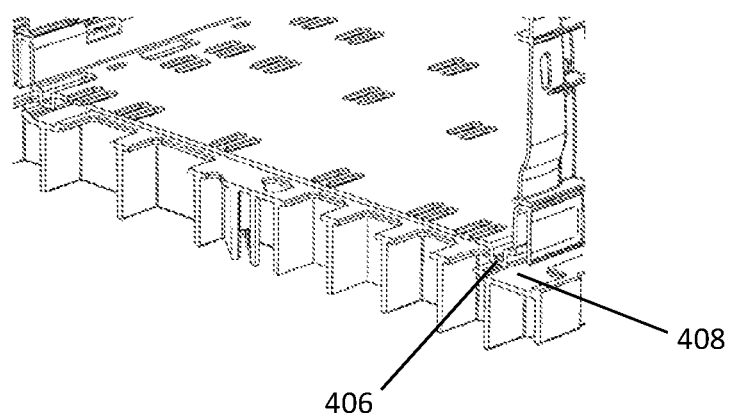
FIG. 4B is a cross-section view of a crate positioned on top of a pallet according to the embodiment of FIG. 4A.

As best seen in FIG. 4B, the crates 404a-404e may further include, for example, one or more inserts 406 positioned on their bottom side, which are compatible with one or more tracks 408 which are configured for receiving the one or more inserts 406. The interengagement between the one or more insert 406 and the one or more tracks 408 ensures the securement and fixation of the crates 404a-404e to the upper surface 104 and allows safe transportation of the crates 404a-404e on top of the pallet 100.

Returning to FIG. 1, the deck 102 further contains a plurality of apertures 117 designed to prevent the accumulation of water and/or other fluids on the upper surface 104 or inside the sockets 108. The plurality of apertures 117 interfere with the continuity of the upper surface 104 and allow water and other fluids to pass through and drain to the floor beneath the pallet 100. The lack of surface continuity prevents the accumulation of water and/or other fluids on top of the upper surface 104. In addition, the plurality of apertures 117 are used to eliminate odors as they allow free passage of air which creates a constant exchange of air that does not allow the formation of bad or unpleasant odors. These apertures are also designed to maximize airflow and allow products and produce loaded on to the pallet 100 that are destined for cold chain applications to reach their required refrigeration/freezing temperature quicker than conventional monoform pallets.

A plurality of friction pads 119 made of a friction enhancing material, for example, an elastomeric material such as rubber are also assembled on the upper surface 104 in order to avoid any friction or contact damages that may occur to the upper surface 104 by another identical pallet positioned on top it during nesting. The plurality of friction pads 119, which are elevated from the upper surface 104, create a space between the pallet 100 and the bottom of an identical upper pallet positioned on top. The created space prevents any encounter or contact between the pallets. These friction pads are also strategically placed to increase the friction between pallet 100 and shipping crates or containers not compatible with the interengagement deck design. Thus, the pallets of the present invention can additionally be used for loads that do not conform to the particular engagement patterns of the deck, such as cardboard containers, wood & wire containers, shrink wrapped products and product placed directly on the pallet deck itself.

The deck 102 further features a plurality of indentations 120 in its external edges deployed symmetrically within each half of the deck 102. The plurality of indentations 120 are used for vertical binding of crates containing transferred products or goods as they allow wrapping the crates deployed on the upper surface 104 with the pallet 100 as one unit using binding elements, for example, strips, bands, tapes and a combination thereof. This ensures the fixation of the crates containing the products or goods to the pallet 100.

Figure 5:
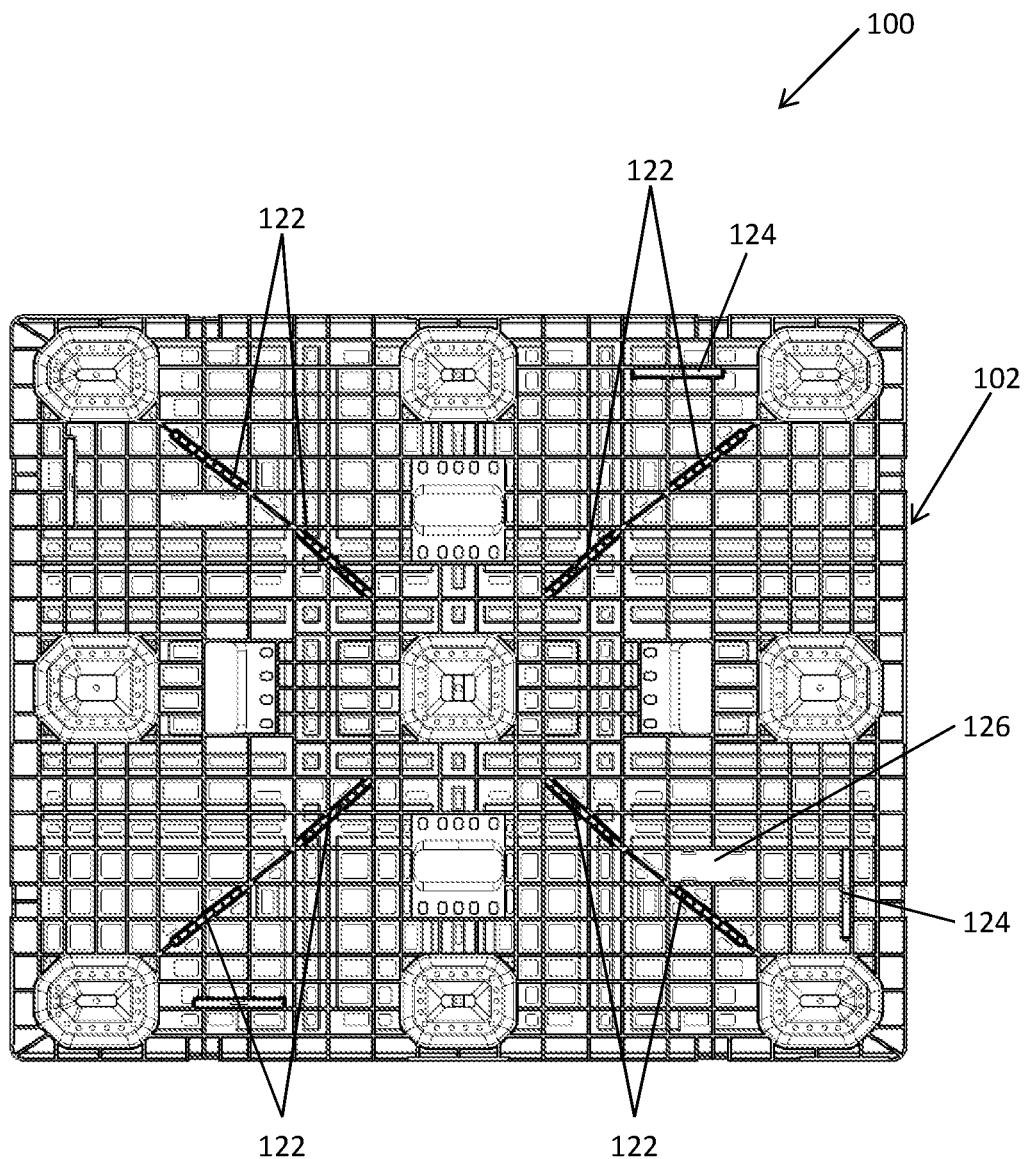
FIG. 5 is a bottom view of the pallet of FIG. 1A.

FIG. 5 is a bottom view of the deck 102. The bottom of deck 102 includes, for example, one or more friction enhancing portion 122 positioned, for example, diagonally in relation to the deck 102. The one or more friction enhancing portion 122 are made of an elastomeric material such as rubber, which once in contact with, for example, a forklift's fork prevent any movement of the pallet 100 on top of the fork to ensure safe lifting and relocation of the pallet 100.

Tags or microchips 124, for example, passive or active tags or computer chips, may also be assembled on the bottom of deck 102 allowing the identification and tracking of the pallet as well as the collection of information in real-time. The tags or microchips are, for example, radio-frequency identification (RFID) tags. Each tag or microchip contains a unique ID number and data is retrieved by an ID reader (a two-way radio transmitter-receiver) (not shown) that sends an encoded signal to the tag. The tag then responds with its identification and any stored information, such as stock number, batch number, production date, etc.

Alternatively or additionally, the bottom of deck 102 may include an electric box 126. The electric box 126 is, for example, an active unit that provides the pallet 100 with smart pallet properties. The electric box 126 may further feature different sensors or batteries, for example, temperature sensors to provide temperature measurements through an electrical signal, or onboard batteries to power electrical, computer, or charging components.

Figure 6A:
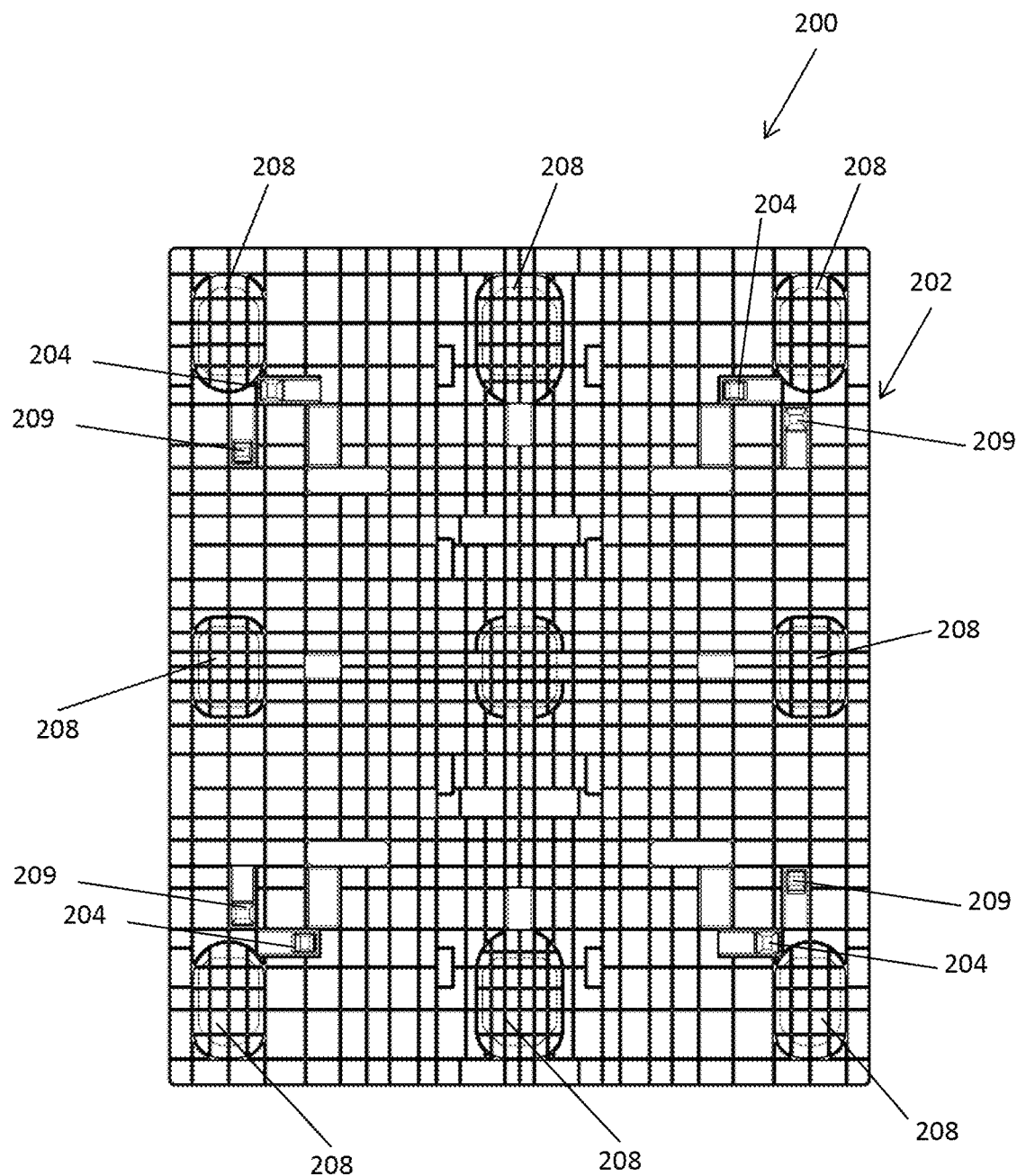
FIG. 6A is a top view of a stacking element according to an embodiment of the present invention.
Figure 6B:
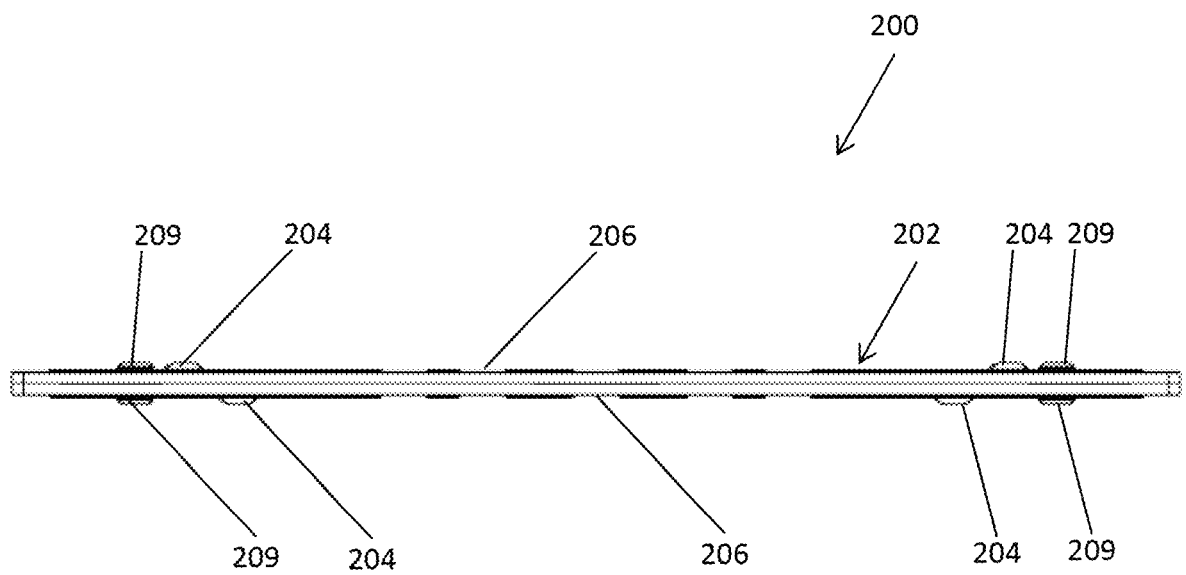
FIG. 6B is a side view of the stacking element of FIG. 6A.

A further aspect of the present invention, useful alone or in combination with the aforementioned pallet, is a stacking element for deploying on top of a layer of crates. FIGS. 6A and 6B are top and side views of the stacking element 200. The stacking element 200 includes a board having a surface 202 for deploying on top of a layer of crates (not shown) and a pattern of recesses formed in the surface 202. The surface 202 is shaped so as to fit closely around the periphery of the upper edges of a layer of crates positioned below it in order to stabilize the layer of crates and provide a complete cover to the crates and their contents.

The pattern of recesses includes, for example, at least two sets of recesses selected for the group consisting of a first set of recesses deployed for receiving the upper edges of 6 crates arranged in a 2×3 array, a second set of recesses deployed for receiving the upper edges of 5 crates arranged in a 5-per-layer configuration, and a third set of recesses deployed for receiving the upper edges of 4 crates arranged in 2×2 array.

Projections 204, similar to those described in relation to the pallet deck, and indentations 206 are found on both sides of the stacking element 200 (FIG. 6B). Both the projections 204 and indentations 206 are configured for engaging with projections and indentations positioned on the upper edges of walls of the crates such that when the stacking element 200 is positioned on top of the crates the complementary projections and indentations engage, allowing the fastening of the stacking element 200 to the top side of the crates. The projections 204 and indentations 206 are configured for engaging with different sizes of crates in different layouts.

Projections 209 are also found on both sides of the stacking element 200. The Projections 209 are configured for engaging with indentations positioned on the bottom and/or top sides of an identical stacking element, allowing nesting of two or more stacking elements for efficient handling and storage space saving.

The stacking element 200 further features a pattern of reinforced regions 210 positioned on its upper side. The pattern of reinforced regions 210 is shaped to accommodate the legs of a pallet placed on top of the stacking element 200. The pattern of reinforced regions 208 distributes the load of the loaded pallet and allows the loaded pallet to be stacked on top of an underlying stack of crates.

Figure 7:
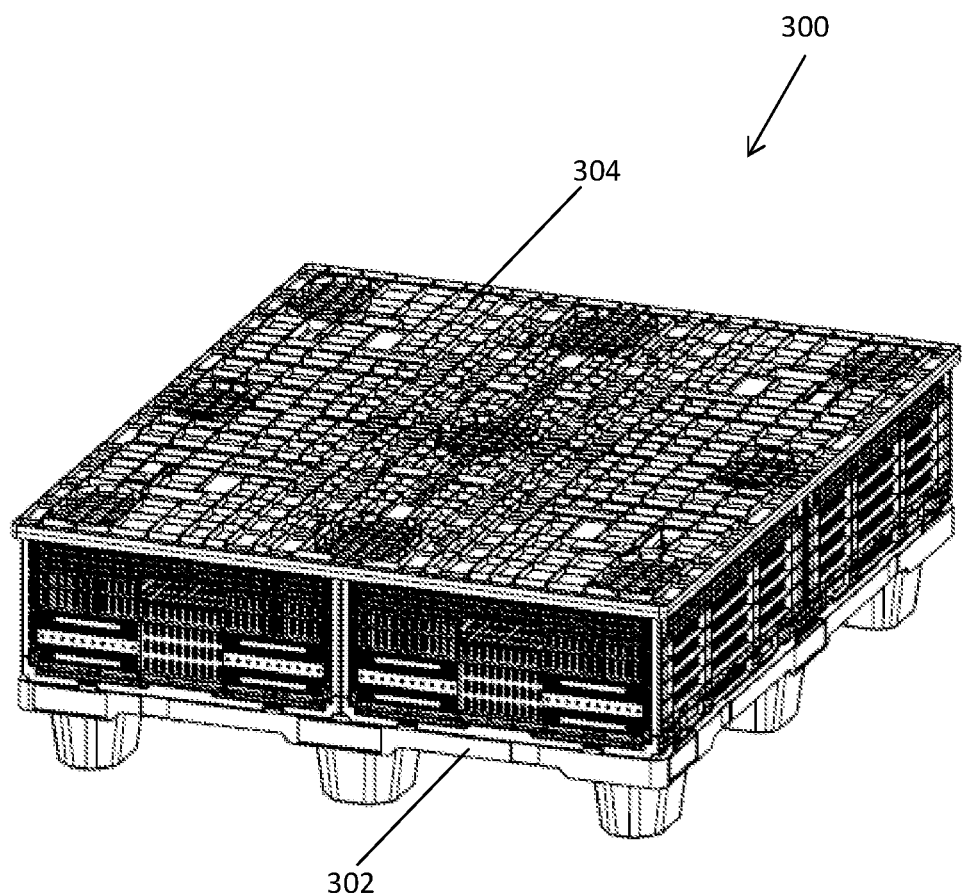
FIG. 7 is a top front left perspective view of a system according to an embodiment of the present invention.

FIG. 7 is a top front left perspective view of the system 300. The system 300 includes a pallet 302, for example, the pallet of FIG. 1, a stacking element 304, for example, the stacking element of FIG. 2, and a plurality of crates deployed on top of the pallet 302 between the pallet 302 and the stacking element 304.

While the invention has been described with respect to a limited number of embodiments, it will be appreciated that many variations, modifications and other applications of the invention may be made. Therefore, the claimed invention as recited in the claims that follow is not limited to the embodiments described herein.

The invention claimed is:

1. A pallet for transporting products comprising:
   a deck comprising a top end and a bottom end opposite from the top end, wherein the top end comprises an upper surface;
   a first plurality of recesses defined in the upper surface and extending in a first direction;
   a second plurality of recesses defined in the upper surface and extending in a second direction that is transverse to the first direction, wherein:
   each recess of the second plurality of recesses intersects each recess of the first plurality of recesses;
   each recess of the first plurality of recesses and of the second plurality of recesses comprises a bottom recess surface;
   the first plurality of recesses and the second plurality of recesses are recessed in the upper surface of the deck such that the bottom recess surfaces are between the top end and the bottom end;
   for both the first plurality of recesses and the second plurality of recesses, a distance between a first pair of adjacent grooves is different from a distance between a second pair of adjacent grooves; and
   at least some of the first plurality of recesses and at least some of the second plurality of recesses form patterns of recesses, the pattern of recesses comprising at least two of:
   a) a first pattern configured to receive a footprint of 6 crates substantially covering said deck and arranged in a 2×3 array, b) a second pattern configured to receive a footprint of 5 crates substantially covering said deck and arranged in a 5-per-layer configuration, or c) a third pattern configured to receive 4 crates in a 2×2 array;

a plurality of legs extending downwards from said deck; and, a plurality of sockets formed in said deck, each socket of said plurality of sockets being positioned and shaped to receive a corresponding leg of another identical pallet to allow nesting of the pallet.

2. The pallet of claim 1, wherein said pallet includes all three patterns.

3. The pallet of claim 1, further comprising a plurality of alignment projections projecting upwards from said upper surface along at least two outer edges of said deck, each of said at least two outer edges having two halves, two of said alignment projections being deployed symmetrically within each of said halves of each of said at least two outer edges.

4. The pallet of claim 1, wherein each of said plurality of sockets includes a central projection extending towards said upper surface.

5. The pallet of claim 1, wherein the deck further comprises a plurality of apertures extending through the deck from the top end to the bottom end.

6. The pallet of claim 1, wherein said deck includes a plurality of indentations in the external edges of said deck deployed for receiving a binding element.

7. The pallet of claim 1, wherein said deck includes at least one friction enhancing portion positioned on the bottom side of said deck.

8. The pallet of claim 7, wherein said friction enhancing portion is formed from an elastomeric material.

9. The pallet of claim 1, further comprising a radio-frequency identification (RFID) tag or computer chip integrated with the pallet.

10. A transportation system comprising the pallet of claim 1, wherein said system further includes:

a stacking element comprising:

a board including a surface for deploying on the upper edges of a layer of crates; and, a pattern of recesses formed in said surface, said pattern of recesses comprising at least two of:

a) a first pattern configured to receive upper edges of 6 crates arranged in a 2×3 array;

b) a second pattern configured to receive upper edges of 5 crates arranged in a 5-per-layer configuration; and, c) a third pattern configured to receive upper edges of 4 crates arranged in a 2×2 array.

11. A stacking element comprising:

a board comprising a first surface and a second surface opposite from the first surface, wherein the first surface is configured to receive upper edges of a layer of crates;

a first plurality of recesses defined in the first surface and extending in a first direction;

a second plurality of recesses defined in the first surface and extending in a second direction that is transverse to the first direction, wherein:

each recess of the second plurality of recesses intersects each recess of the first plurality of recesses;

each recess of the first plurality of recesses and of the second plurality of recesses comprises a bottom recess surface;

the first plurality of recesses and the second plurality of recesses are recessed in the first surface such that the bottom recess surfaces are between the first surface and the second surface; and for both the first plurality of recesses and the second plurality of recesses, a distance between a first pair of adjacent grooves is different from a distance between a second pair of adjacent grooves; and at least some of the first plurality of recesses and at least some of the second plurality of recesses form patterns of recesses in the first surface, the pattern of recesses comprising at least two sets of recesses selected for the group consisting of:

a) a first pattern configured to receive upper edges of 6 crates arranged in a 2×3 array;

b) a second pattern configured to receive upper edges of 5 crates arranged in a 5-per-layer configuration; and, c) a third pattern configured to receive upper edges of 4 crates arranged in 2×2 array.

12. The stacking element of claim 11, wherein said stacking element includes all three patterns.

13. The stacking element of claim 11, further comprising at least one engagement feature configured to engage with features on the upper edges of said layer of crates.

14. The stacking element of claim 13 wherein, said at least one engagement feature is a projection positioned on the second surface.

15. The stacking element of claim 13 wherein, said at least one engagement feature is an indentation positioned on the second surface.

16. The stacking element of claim 11, further comprising at least one engagement feature positioned on the first surface or the second surface, said at least one engagement feature is configured to engage with features on a corresponding stacking element.

17. The stacking element of claim 16 wherein, said at least one engagement feature is a projection.

18. The stacking element of claim 16 wherein, said at least one engagement is an indentation.

19. The stacking element of claim 11 wherein, said first surface includes a plurality of reinforced regions configured to accommodate the legs of a pallet positioned on top of the stacking element.

20. A transportation system comprising the stacking element of claim 11 wherein, said system further includes:

a pallet for transporting products including:

a deck having an upper surface; and, a plurality of legs extending downwards from said deck.

21. The transportation system of claim 20, wherein said stacking element includes a plurality of reinforced regions configured to accommodate the legs of said pallet positioned on top of said stacking element.

* * * * *